Dec. 8, 1931.                A. MORRA                1,835,804
MEASURING DEVICE
Filed Feb. 27, 1931
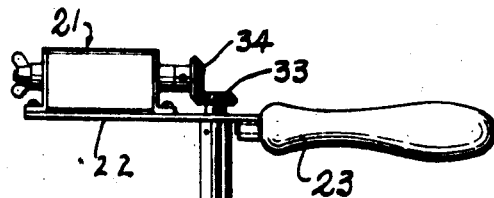
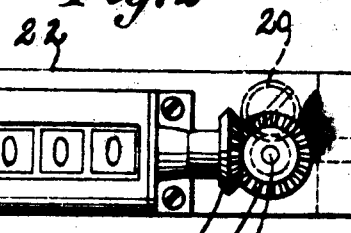
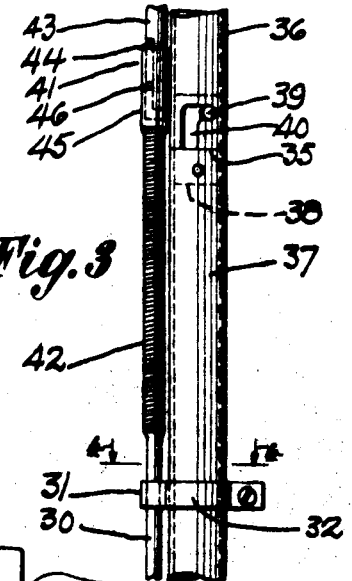
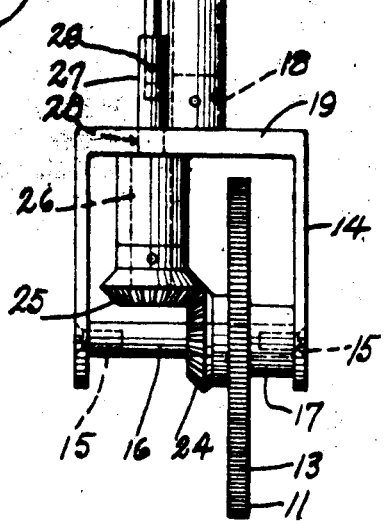

Patented Dec. 8, 1931

1,835,804

UNITED STATES PATENT OFFICE

ANGELO MORRA, OF BROOKLYN, NEW YORK

MEASURING DEVICE

Application filed February 27, 1931. Serial No. 518,743.

This invention relates to measuring devices.

One object of the invention is to provide an improved device for taking linear measurements over comparatively long distances.

Another object is to furnish a device including a rotary measuring element and a counter having improved co-ordination with each other.

Another object is to furnish a device which can be manipulated for taking ground measurements while being manipulated by an operator walking therealong in a comfortable upright manner, and wherein the possibilities of error are diminished.

Another object of the invention is to construct a measuring device of improved construction for easy collapsing into a compact condition, and for an expeditious setting up for use.

A further object of the invention is the provision of a device having few and simple parts, and which is reliable, rugged and efficient in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawings, wherein like parts are designated by the same reference characters throughout the several views.

In the drawings:

Figure 1 is a view in side elevation of a device embodying the invention.

Fig. 2 is a plan view thereof.

Fig. 3 is an enlarged view with parts removed taken at right angles to Fig. 1.

Fig. 4 is a sectional view taken on line 4—4 of Fig. 3.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawings, therefore, is submitted merely as showing the preferred exemplification of the invention.

This invention is capable of many different uses as in measuring the length of lumber and other objects, although an especial advantage thereof may be perceived in connection with the measurement of streets. In that connection, it has heretofore been the practice to use a flexible or tape measure operated by two men, with possibilities of error due to stretching or other change in condition of the tape, which was moreover subject to breakage and other obvious inconveniences, due to traffic and the like. My invention, on the contrary, can be operated by one man, walking in a comfortable position, and with elimination of the inconveniences aforementioned.

Referring in detail to the drawings, 10 denotes a device embodying the invention. The same includes a rotary element such as a disc 11 whose circumference may be arranged to be of a convenient dimension, as, for instance, one foot in length. This rotary element may carry indicia 12 dividing the circumference of the same into units of measurement such as inches. The periphery of the element may be suitably constructed for a surface gripping action as by knurling at 13. By making the element of a proper hard metal, the same may have a very long life.

Mounting the rotary element 11 is any suitable means, for instance, the yoke 14 which may carry alined screws 15 for engaging a shaft 16. The latter may rotatably support the element 11 which may have a spacing hub 17 contacting an arm of the yoke. Connected in any suitable manner at 18 to the cross member 19 of the yoke, as by means of an integral pin of the yoke, is an elongated means 20 which may be in the nature of a tubular device of any desired length receiving the yoke pin. Mounted at the upper end of the device 20 is a counter 21 of any well known type. The same may be secured to a plate 22, for example, and a handle 23 connected therewith. While the counter may be disposed in any feasible manner, it is preferably so arranged as to facilitate a drive connection with the rotary element 11.

Said drive connection can be variously arranged, and may include a bevel gear 24 secured to the rotary element. Meshing with the teeth of the bevel gear 24 is a bevel gear 25 disposed within the yoke and fixed on a shaft 26 having a reduced portion 27 journaled at 28 in the member 19. Connected to said shaft at 29 is a shaft 30 journaled at 31 in an extension or lug secured as by means of a clamp 32 to the tubular device 20. Co-operating with the shaft 30 is a suitable means connected with an alined bevel gear 33 mounted on the plate 20 and having the teeth thereof in meshing relation with those of a bevel gear 34 connected to the counter 21.

In order to permit the device to be collapsed into a compact condition, the device 20 may be split at 35 into the parts 36, 37 for interconnection in any feasible manner as by a tubular member 38 extending from the member 37 and adapted to enter the adjacent end of the member 36 with which it is adapted to be releasably secured by having a pin 39 engaged with a bayonet slot 40 in the member 36. Likewise, the shaft connecting upper and lower drive portions must be split at 41 for easy attachment and detachment. For this purpose said shaft may include a flexible portion such as a coil spring 42 connected at one end to the shaft section 30, and adjacent to its other end releasably connected with a shaft section 43, which may also be journaled in a fixed bearing 44 similar to bearing 31 and secured to the upper standard section 37. The shaft section 43 may be undercut at 44 for reception in a non rotatable manner in a socket 45 secured to the spring 42. The said socket may have an irregular opening which may be formed by a pin 46 engageable with the flat side of the undercut.

In connecting the sections 36, 37, the flexible shaft section 42 is simultaneously given a lateral bend for receiving into the socket 45 thereof the undercut portion 44 of the shaft 43. Then on relatively turning the standard sections 36, 37 to cause interengagement at the bayonet slot, the shaft sections 42 and 43 assume an alined position and proper angular relation, without in any way actuating the counter 21 or affecting the reading thereof. The spring may have sufficient strength to properly transmit torque to the counter.

The counter may read in various units, for instance, in tens, hundreds, and thousands of feet, while the inches may be read directly from the disc 11. In measuring a street from curb to curb, it is clear that owing to the tangent contact at right angles with the curb, a dimension equal to one diameter of the disc 11 must be added to the measurement indicated by the counter 21. This dimension may be stamped upon the device so as to be always readily determined, or the disc may be turned through a quarter or half turn with the aid of the indicia on the disc.

I claim:

1. A measuring device including a rotary ground running measuring element, a standard connected at one end thereto, a counter at the other end of the standard, means including a rotary shaft extending along said standard for operatively interconnecting the element and the counter, said standard and said shaft being split into sections, and means for detachably interconnecting said sections.

2. A measuring device including a rotary ground running measuring element, a standard connected at one end thereto, a counter at the other end of the standard, means including a rotary shaft extending along said standard for operatively interconnecting the element and the counter, said standard and said shaft being split into sections, and means for detachably interconnecting said sections, the last mentioned means including interconnecting means for the standard sections made effective by a relative partial turn of the sections, said shaft having a flexible portion, and interconnecting means for the shaft sections at said flexible portion, whereby the shaft sections may be interconnected at the beginning of the partial turn of the standard sections by deforming the flexible shaft portion.

3. A measuring device including a rotary ground running measuring element, a standard connected at one end thereto, a counter at the other end of the standard, means including a rotary shaft extending along said standard for operatively interconnecting the element and the counter, said standard and said shaft being split into sections, and means for detachably interconnecting the said sections, the last mentioned means including a bayonet slot connection between the sections of the standard for interconnecting the same by a relative angular movement of the sections, the shaft having a flexible portion, and means for interconnecting the sections of the shaft in angularly spaced relation to a portion of the bayonet slot by deforming said flexible shaft portion, the latter coming into alinement with the rest of the shaft on fully interengaging the bayonet slot connection.

In testimony whereof I affix my signature.

ANGELO MORRA.